March 28, 1933. E. S. YANGA 1,903,276
FISH TRAP
Filed Sept. 6, 1932 3 Sheets-Sheet 2
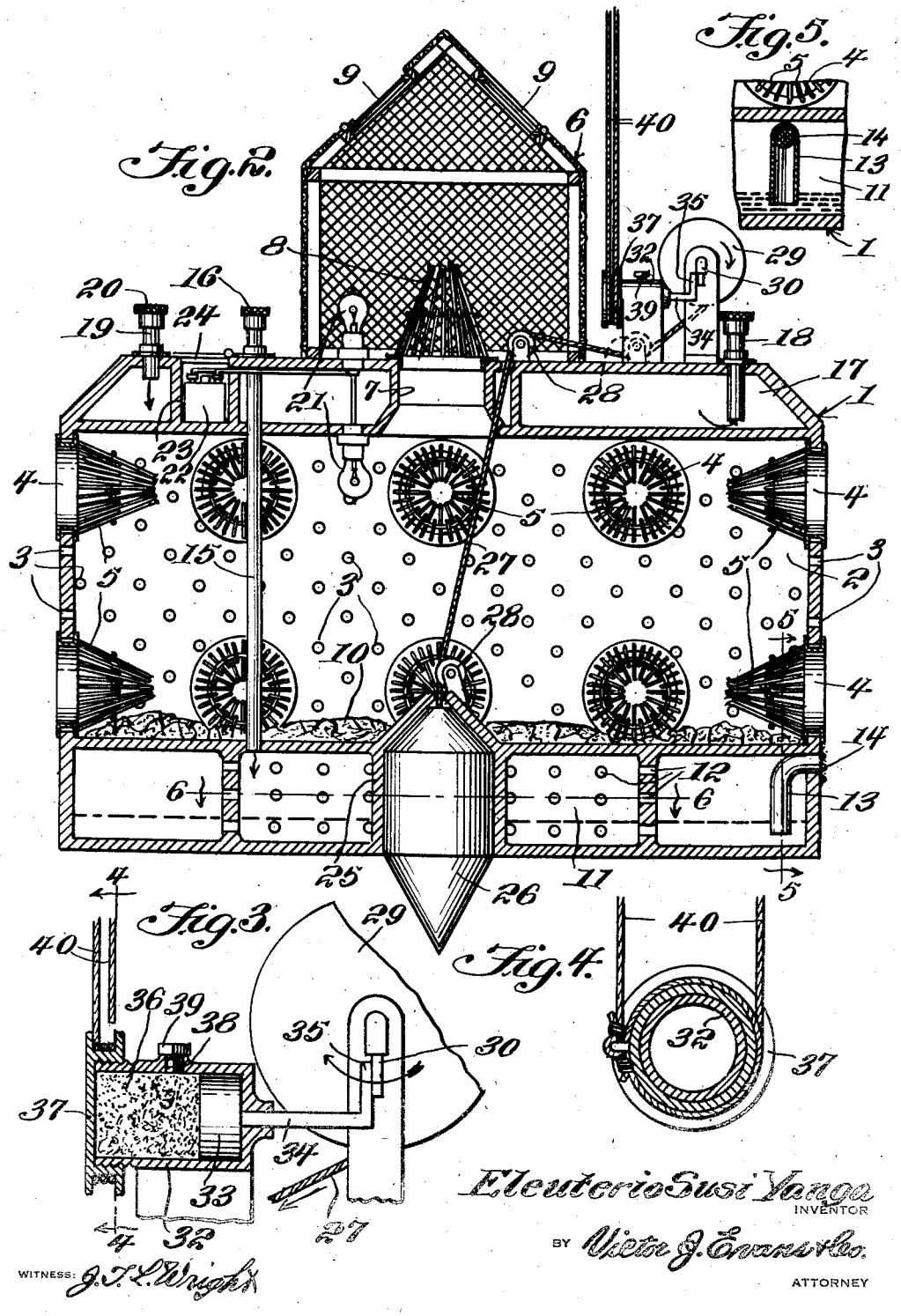

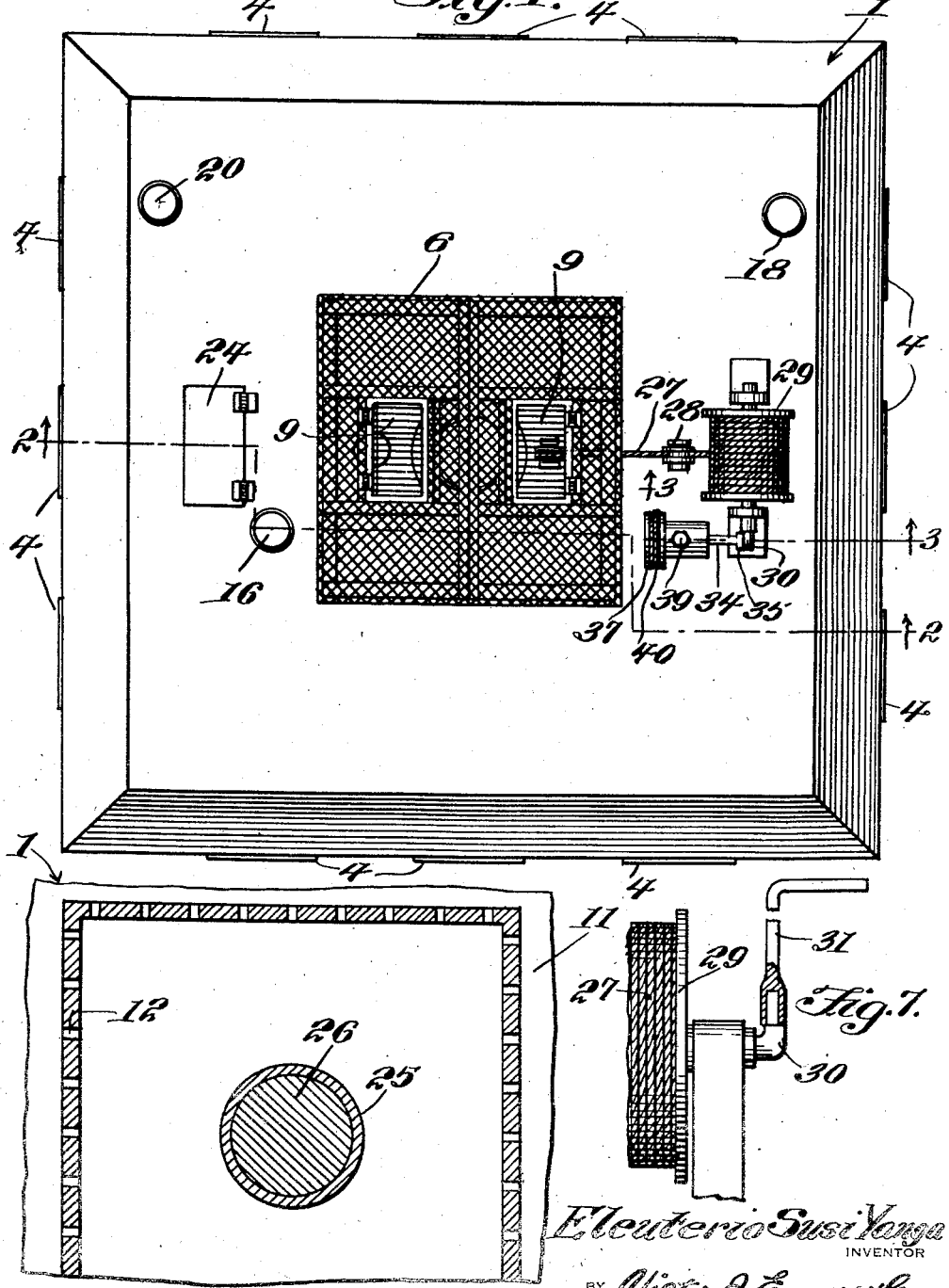

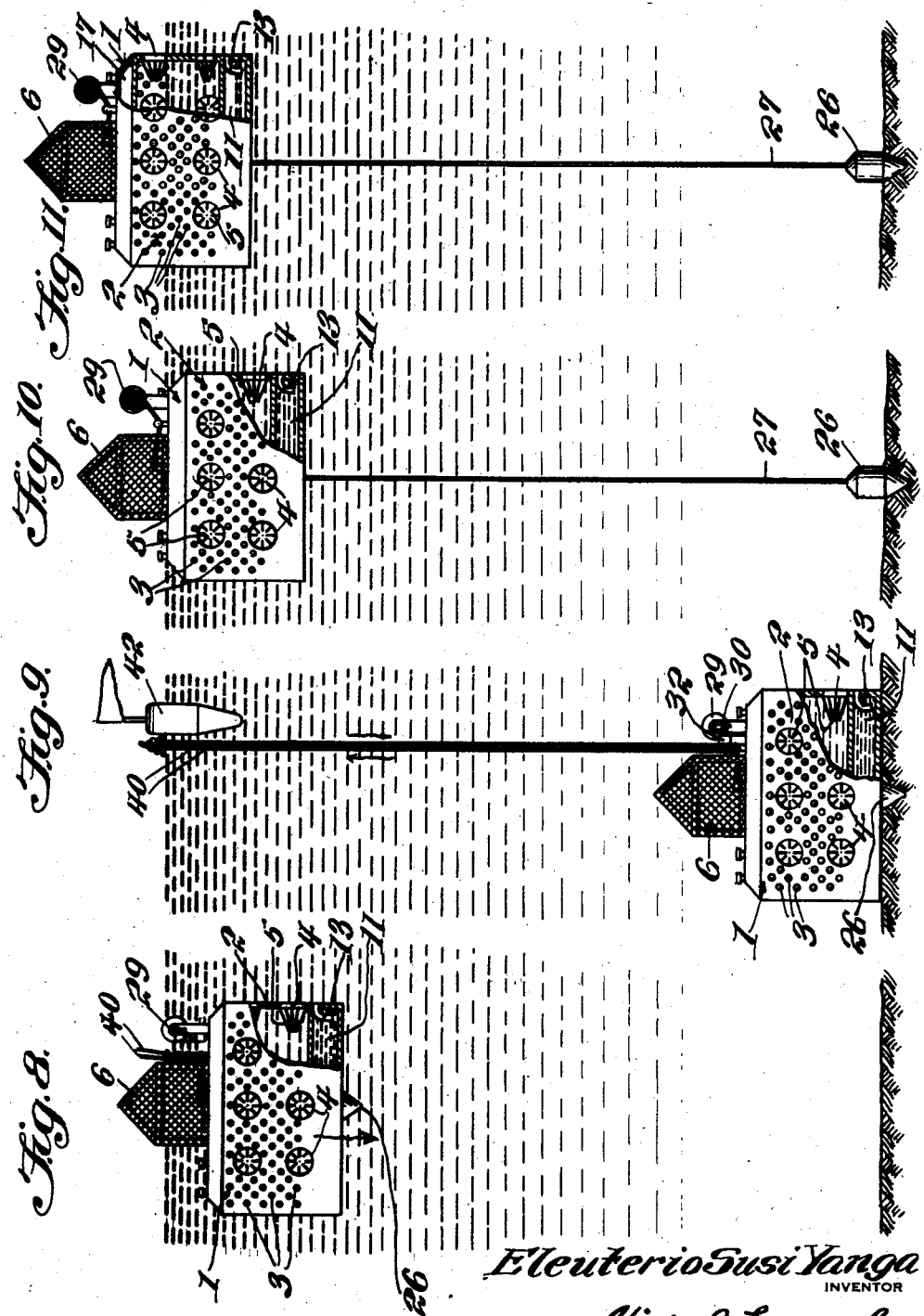

Patented Mar. 28, 1933

1,903,276

UNITED STATES PATENT OFFICE

ELEUTERIO SUSI YANGA, OF VALLADOLID, OCCIDENTAL NEGROS, PHILIPPINE ISLANDS

FISH TRAP

Application filed September 6, 1932. Serial No. 631,911.

This invention relates to fish traps and has for the primary object, the provision of a device of the above stated character which may be caused to submerge or move to the bottom of a body of water for a predetermined length of time and after the expiration of such time to automatically ascend to the surface of the water so that fish or other water animals caught by the trap while submerged may be removed and the device again adjusted and conditioned for another submergence and trapping of fish and the like.

Another object of this invention is the provision of means whereby the trap may be manually caused to ascend to the surface of the water before the expiration of time allotted for the device to ascend automatically and which means provides a signal at the surface of the water to indicate the approximate location of the trap while submerged.

A further object of this invention is the provision of a fish trap of the above stated character which may be constructed in various sizes and of different material suitable for the purpose and which will be efficient, durable and practical and inexpensive to manufacture and thereby permit sale thereof at a comparatively low cost.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a fish trap constructed in accordance with my invention.

Figure 2 is a vertical sectional view approximately on the line 2—2 of Figure 1.

Figure 3 is a detail sectional view taken on the line 3—3 of Figure 1.

Figure 4 is a detail sectional view illustrating the manual control means for effecting the raising of the trap.

Figure 5 is a detail sectional view taken on the line 5—5 of Figure 2.

Figure 6 is a sectional view taken on the line 6—6 of Figure 2.

Figure 7 is a fragmentary view partly in section illustrating the application of a crank handle to a drum for raising a weight or anchor after the ascent of the trap to the surface of the water.

Figure 8 is a side elevation partly in section illustrating the trap in the act of submerging.

Figure 9 is a similar view showing the trap submerged and resting upon the bottom of a body of water.

Figure 10 is a similar view showing the trap after ascending and partially exposed at the surface of the water.

Figure 11 is a similar view showing the trap positioned at the surface of the water ready to remove fish and the like therefrom and also ready to have the weight or anchor elevated.

Referring in detail to the drawings, the numeral 1 indicates the body of the trap which may be constructed of any size and of any material suitable for the purpose and includes a main chamber 2, certain walls of which are provided with perforations 3 allowing water to circulate freely in and out of the main chamber. The side and end walls of the main chamber are provided with entrances 4 over which are positioned guards 5 arranged upon the interior of the body and adapted to permit entrance of fish and the like into the main body when submerged in water. Each guard 5 is of substantially conical shape having a restricted opening at its apex. The guard 5 is constructed from a series of closely arranged wires or rods arranged in conical formation and attached to the body 1 at one end while the opposite ends are pointed or sharpened for the purpose of penetrating or sticking a fish when endeavoring to escape from the main compartment. A cage 6 of foraminous material is mounted on the top of the body 1 and has communication with the interior of the main compartment by a passage 7 also equipped with a guard 8 similar in construction to the guards 5 so that fish caught within the main compartment may pass into the cage and the latter being provided with trap doors 9 so that the fish within the cage may be conveniently removed. Fish food or any other suitable bait 10 is placed within the main compartment and rests upon the bottom wall thereof for the purpose of attracting fish into the main compartment.

A combined air and water chamber 11 is formed in the body 1 below the main compartment and is provided with perforated partitions 12 for the purpose of reinforcing the device. An L-shaped pipe 13 has one end fitting within an opening formed in the walls of the chamber 11 while its opposite end terminates a slight distance above the bottom wall of the chamber 11 for the purpose of admitting a predetermined amount of water within the chamber 11 as soon as the body is placed within a body of water. Foraminous material 14 is placed over the intake end of the pipe 13 to prevent the entrance of foreign matter into the chamber 11. An air pipe 15 communicates with the chamber 11 and extends through the top wall of the body 1 and is provided with a suitable regulating cap 16 designed to permit air pressure to be introduced into the chamber 11 and confined therein.

The upper portion of the body 1 is constructed to form a buoyancy compartment 17 having a vent means 18 and an air supply pipe 19 equipped with a cap or closure 20 similar to the cap 16, whereby air pressure may be introduced into the chamber 17 when desired. The vent means 18 being provided for the purpose of allowing the air pressure to escape when desired and also any water which may seep into the chamber 17.

Illuminating electric lamps 21 are arranged within the main compartment 2 and the cage 6 and are electrically connected to a battery or other electrical source 22 located within a chamber 23 of the body 1, the chamber 23 being provided with a trap door 24 so that the battery may be conveniently placed in or removed from the chamber when necessary.

A weight chamber 25 is formed in the bottom of the body 1 to receive a weight or anchor 26 to which a cable 27 is connected and passes upwardly through the body and over a series of pulleys 28 and is wound on a rotatably mounted drum 29 located on the top of the body 1. The shaft of the drum is provided with a crank arm 30 to which may be attached a crank handle 31 for the purpose of winding the cable 27 onto the drum after being paid therefrom. The crank handle 31 is removed from the arm 30 while the trap is submerged in the water.

A cylinder 32 is located adjacent the drum and extends at right angles thereto and has located therein a piston 33 provided with a piston stem 34 extending outwardly of the cylinder and provided with a rightangular extension 35 adapted to be positioned to engage the crank arm 30 for the purpose of preventing the drum 29 from rotating and unwinding the cable therefrom by the influence of the weight 26. To retain the piston 33 at one end of the cylinder 32 and against sliding movement influenced by the crank arm 30 of the drum, salt or other solvent material 36 is placed in the cylinder by way of a removable cap 37. The cylinder 32 is also provided with a vent opening 38 controlled by a threaded plug 39 which may be adjusted for the purpose of admitting water into the cylinder when the device is submerged.

The cap 37 is of the flange type and threaded to the cylinder and has wound thereon a cable 40. The cable provides a pair of runs which are adapted to extend to the surface of the water when the device is submerged and be attached to a float 42 acting as a signal to indicate the approximate location of the trap when submerged, as shown in Figure 9.

In operation after the trap has been properly baited to be placed in the water along with the float 42, air is released from the chamber 17 and as the body enters the water, a certain amount of water enters the chamber 11 due to the pipe 13. The weight 26 occupying a position in the weight chamber 25 overcomes the buoyancy of the chambers 11 and 17 and causes the body to submerge and rest upon the bottom of the water as shown in Figure 9. In this position fish and the like may enter the main compartment and pass into the cage. Prior to placing the trap or body in the water the plug 39 is adjusted to admit water into the cylinder 32 when the trap is submerged, causing the salt or like material within a predetermined time to dissolve, freeing the piston 33. The salt becoming liquefied will be forced from the cylinder in a sufficient amount to permit the piston to shift its position and the stem thereof to move out of frictional contact with the crank arm 30, freeing the weight from the body 1 and due to the buoyancy derived from the chambers 11 and 17 the body ascends to the surface of the water, as shown in Figure 10. It is to be understood that the dissolved salt escapes from the cylinder the same way the water enters said cylinder. When in this position an additional amount of air may be forced into the chamber 17, providing greater buoyancy to the body and causing the latter to assume a position as shown in Figure 11. While in the latter named position fish may be conveniently removed from the cage through the trap doors 9. The crank handle 31 is then applied to the crank arm 30 and the drum 29 rotated to raise the weight 26 and move the same into the compartment or weight chamber 25. After the fish have been removed and the trap again baited and adjusted the air pressure in the chamber 17 is reduced and the weight again causes the trap or body to submerge.

Should it be desirable to raise or cause the trap to ascend prior to the dissolving of the salt or like material by the seepage of water through the control vent 39 the cap 37 may be rotated by manually manipulating the runs of the cable 40 so as to allow the material to become quickly dissolved, whence the device will automatically ascend to the surface of the water as soon as the piston shifts its position to free the crank arm 30 of the drum 29.

While I have shown and described the preferred embodiment of my invention, it will be understood that minor changes in construction, combination and arrangement of parts may be made without departing from the spirit and scope of my invention, as claimed.

Having described the invention, I claim:

1. A fish trap comprising a body having a main compartment provided with entrances to permit fish to enter said compartment while the body is submerged in water, means to prevent the escape of fish from said compartment by way of said entrances, a cage carried by the body and having communication with the main compartment, means to prevent the return of fish from the cage to the main compartment, and means to cause submerging of the body and the automatic ascent thereof to the surface of the water after the expiration of a period of time.

2. A fish trap comprising a body having a main compartment provided with entrances to permit fish to enter said compartment while said body is submerged in water, means to prevent the escape of fish from said compartment by way of said entrances, said body having air and water chambers, means for admitting air pressure to the chambers and the escape of said pressure when desired, means for admitting a predetermined amount of water to one of said chambers, a weight movably connected to the body and when in engagement therewith adapted to cause the sinking of the body in a body of water, and means for releasing the weight from contact with the body to permit the latter to ascend to the surface of the water.

3. A fish trap comprising a body having a main compartment provided with entrances to permit fish to enter said compartment while said body is submerged in water, means to prevent the escape of fish from said compartment by way of said entrances, said body having air and water chambers, means for admitting air pressure to the chambers and the escape of said pressure when desired, means for admitting a predetermined amount of water to one of said chambers, a weight movably connected to the body and when in engagement therewith adapted to cause the sinking of the body in a body of water, and means for automatically, after the expiration of a period of time, freeing the weight from contact with the body and permit the ascent of the body to the surface of the water.

4. A fish trap comprising a body having a main compartment provided with entrances to permit fish to enter said compartment while said body is submerged in water, means to prevent the escape of fish from said compartment by way of said entrances, said body having air and water chambers, means for admitting air pressure to the chambers and the escape of said pressure when desired, means for admitting a predetermined amount of water to one of said chambers, a weight movably connected to the body and when in engagement therewith adapted to cause the sinking of the body in a body of water, a cable connected to the weight, a drum carried by the body and having the cable wound thereon to maintain the weight in engagement with the body for causing the body to submerge in water, and means for holding the drum against operation during the submerging of the body and for a predetermined length of time and adapted after the expiration of such time to free the drum and allow the weight to separate from the body and the latter to ascend to the surface of the water.

5. A fish trap comprising a body having a main compartment provided with entrances to permit fish to enter said compartment while said body is submerged in water, means to prevent the escape of fish from said compartment by way of said entrances, said body having air and water chambers, means for admitting air pressure to the chambers and the escape of said pressure when desired, means for admitting a predetermined amount of water to one of said chambers, a weight movably connected to the body and when in engagement therewith adapted to cause the sinking of the body in a body of water, a cable connected to the weight, a drum carried by the body and having the cable wound thereon to maintain the weight in engagement with the body for causing the body to submerge in water, a cylinder located adjacent the drum, a piston in said cylinder, a stem on the piston and engaging the drum to hold the latter against operation by the influence of the weight, solvent material in the cylinder to hold the piston against movement, and means for regulating the entrance of water to the cylinder to dissolve the solvent and free the drum and weight from the body for allowing the latter to ascend to the surface of the water.

6. A fish trap comprising a body having a main compartment provided with entrances to permit fish to enter said compartment while said body is submerged in water, means to prevent the escape of fish from said compartment by way of said entrances, said body having air and water chambers, means for admitting air pressure to the chambers and the escape of said pressure when desired, means for admitting a predetermined amount of water to one of said chambers, a weight movably connected to the body and when in engagement therewith adapted to cause the sinking of the body in a body of water, a cable connected to the weight, a drum carried by the body and having the cable wound thereon to maintain the weight in engagement with the body for causing the body to submerge in water, a cylinder located adjacent the drum, a piston in said cylinder, a stem on the piston and engaging the drum to hold the latter against operation by the influence of the weight, solvent material in the cylinder to hold the piston against movement, means for regulating the entrance of water to the cylinder to dissolve the solvent and free the drum and weight from the body for allowing the latter to ascend to the surface of the water and manually controlled means extending to the surface of the water during the submerging of the body to permit opening of the cylinder and the destruction of the solvent by the water.

7. A fish trap comprising a body having a main compartment provided with entrances to permit fish to enter said compartment while said body is submerged in water, means to prevent the escape of fish from said compartment by way of said entrances, said body having air and water chambers, means for admitting air pressure to the chambers and the escape of said pressure when desired, means for admitting a predetermined amount of water to one of said chambers, a weight movably connected to the body and when in engagement therewith adapted to cause the sinking of the body in a body of water, a cable connected to the weight, a drum carried by the body and having the cable wound thereon to maintain the weight in engagement with the body for causing the body to submerge in water, a cylinder located adjacent the drum, a piston in said cylinder, a stem on the piston and engaging the drum to hold the latter against operation by the influence of the weight, solvent material in the cylinder to hold the piston against movement, means for regulating the entrance of water to the cylinder to dissolve the solvent and free the drum and weight from the body for allowing the latter to ascend to the surface of the water, manually controlled means extending to the surface of the water during the submerging of the body to permit opening of the cylinder and the destruction of the solvent by the water and a float connected to the last-named means.

In testimony whereof I affix my signature.

ELEUTERIO SUSI YANGA.